United States Patent [19]
Weinstein

[11] Patent Number: 5,153,665
[45] Date of Patent: Oct. 6, 1992

[54] VAPORIZING PARTICLE VELOCIMETER

[75] Inventor: Leonard M. Weinstein, Newport News, Va.

[73] Assignee: The United States of America as represented by the Administrator of the National Aeronautics and Space Administration, Washington, D.C.

[21] Appl. No.: 718,313

[22] Filed: Jun. 14, 1991

[51] Int. Cl.$^5$ ............................................... G01P 3/36
[52] U.S. Cl. ................................ 356/28; 73/861.05; 356/318
[58] Field of Search ................ 356/28, 28.5, 317, 318; 73/861.05, 861.95

[56] References Cited

U.S. PATENT DOCUMENTS

| | | |
|---|---|---|
| 3,101,414 | 8/1963 | Grabowsky . |
| 3,847,484 | 11/1974 | Gropper et al. . |
| 4,392,749 | 7/1983 | Clemmons, Jr. . |
| 4,396,943 | 8/1983 | Lord et al. ........................ 356/28 X |
| 4,654,803 | 3/1987 | Sell . |
| 4,664,513 | 5/1987 | Webb et al. ........................... 356/28 |
| 4,786,168 | 11/1988 | Meyers et al. . |
| 4,919,536 | 4/1990 | Komine . |
| 5,000,566 | 3/1991 | Kuppenheimer . |
| 5,002,389 | 3/1991 | Benser . |

Primary Examiner—Mark Hellner
Attorney, Agent, or Firm—Kevin B. Osborne

[57] ABSTRACT

A velocimeter measures flow characteristics of a flow travelling through a chamber in a given direction. Tracer particles are entrained in the flow and a source of radiant energy produces an output stream directed transverse the chamber and having a sufficient intensity to vaporize the particles as they pass through the output stream. Each of the vaporized particles exploding to produce a shock wave and a hot core, and a flow visualization system tracks the motion of the hot cores and shock waves to thereby measure velocity of each tracer particle, and temperature of the flow around the tracer.

12 Claims, 2 Drawing Sheets

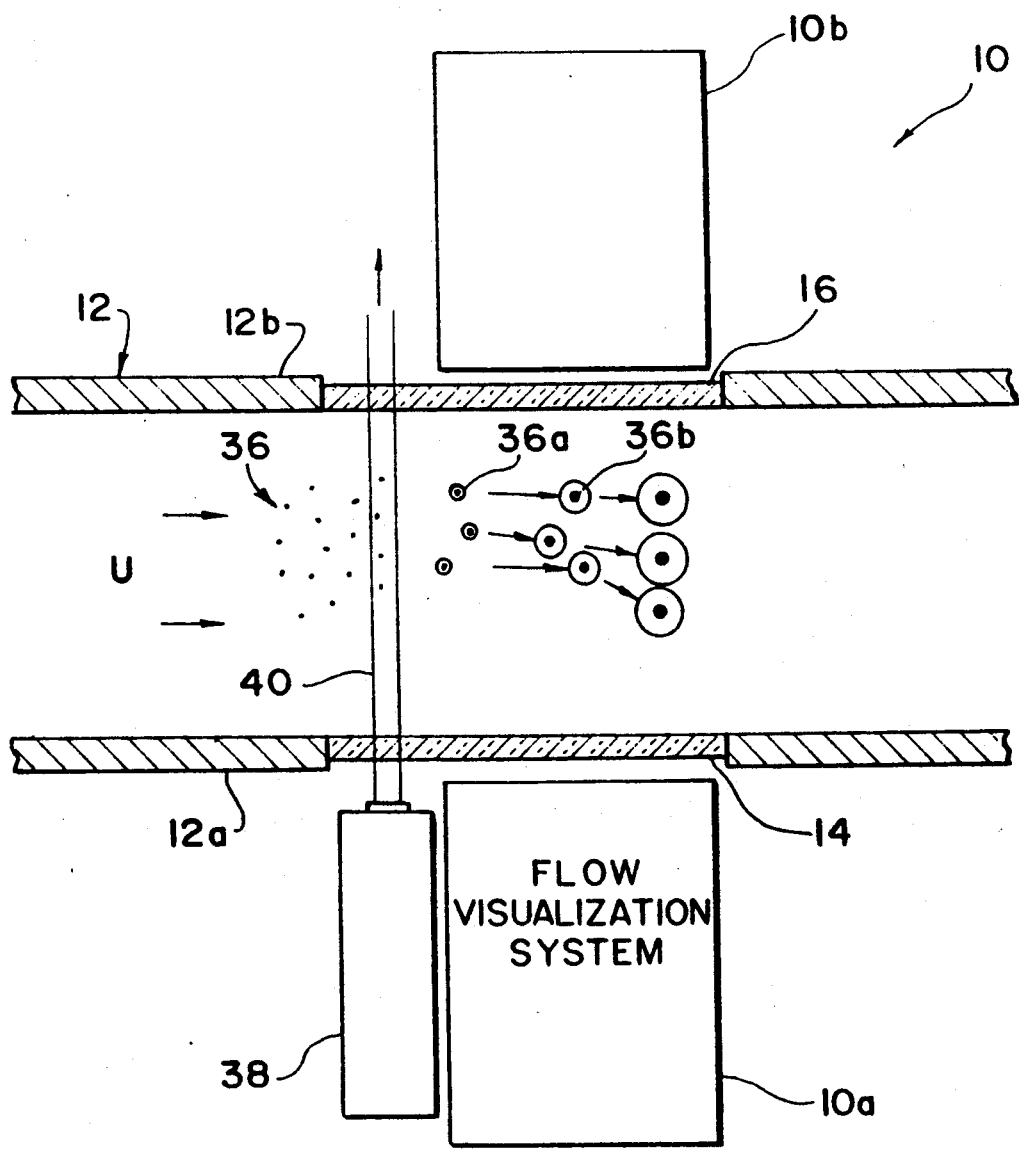

VAPORIZING PARTICLE VELOCIMETER

ORIGIN OF THE INVENTION

The invention described herein was made by employees of the U.S. Government and may be manufactured and used by or for the Government for governmental purposes without the payment of any royalities thereon or therefore.

BACKGROUND OF THE INVENTION

1. Field of the Invention

The present invention relates generally to flow field analysis during wind tunnel testing and, more specifically, to a velocimeter capable of simultaneously measuring flow velocity and temperature at several points in supersonic and hypersonic flows using vaporizing particles.

2. Description of the Related Art

Laser velocimeters measure the velocity of small particles entrained in a fluid flow field. A transmission optical system divides a single laser beam into two equal path length beams and focuses these beams so they cross at a point within the flow field. Since laser light is monochromatic and coherent, a fringe pattern will be formed within the sample volume at the cross-over point. As a small particle passes through the fringe pattern, it scatters light whose intensity will oscillate as the particle passes through the alternating light and dark regions of the fringe pattern. A portion of this scattered light is collected by a receiver which directs the collected light to a photocathode surface of a photomultiplier. The photomultiplier converts the optical signal to an electrical signal, which is a collection of Poisson distributed photo electrons whose average occurrence rate is proportional to the instantaneous light intensity at the photocathode. As the intensity increases from the photon resolved regime, i.e., one photon per response time of the photomultiplier, the additional photon arrivals within the response time add voltage to the output signal. With sufficient photons, the signal approaches a Gaussian shaped signal burst containing the oscillation frequency. A measurement of the oscillation frequency is multiplied by the distance between adjacent fringes to yield the velocity of the particle.

Improvements have been made in basic laser diagnostic technology to allow measurement of the velocity and temperature of the flow at one or more points in the flow field. One such improvement is Laser Doppler Velocimetry (LDV), which measures velocity at a point as a function of time. For example, U.S. Pat. No. 4,919,536 (issued to Komine) describes a system which uses a laser doppler spectral image converter. A flow field is seeded with particles, as in conventional laser velocimeters, which are illuminated by a collimated, monochromatic laser light sheet. Doppler shifted scattering from particle motion is imaged by an optical system. An optical frequency-to-intensity converter is located at the image plane such that the transmitted image contains a simultaneous two-dimensional measurement of flow velocity along a direction determined by a laser beam and observer direction. These images are observed directly or through a TV-2-D array camera and monitor or processed through a computer system.

Particle Image Velocimeter (PIV) also measures velocity in a planar image at a single time, while Laser Induced Fluorescence (LIF) and Coherent Anti-Stokes Raman Spectrocopy (CARS) can measure temperature at one or more locations. For example, U.S. Pat. No. 5,002,389 (issued to Benser) describes a pulsed fluorescence velocimeter that determines dynamic parameters of a gas flow from detection of fluorescent re-radiation of excited molecules of the gas.

Other known measurement techniques include Raman Excitation and Laser Induced Electronic Fluorescence (RELIEF) and Laser Induced Photochromic/Fluorescence Anemometry (LIPFA) both of which can give the velocity for several points and along lines for several time increments.

Methods which require solid or liquid tracer particles, including LDV, PIV, and LIPFA, all have limitations at high speeds where the particles lag rapid changes in velocity and do not correctly represent the flow field. Moreover, LIF and CARS give temperature (as well as density) but not velocity. RELIEF, which gives velocity without solid or liquid tracer particles, is extremely complex to implement and is limited in the flow temperature range and gas composition that is useable.

SUMMARY OF THE INVENTION

An object of the present invention is to provide a velocimeter and method capable of simultaneously measuring flow velocity and temperature at several points in high speed flows, particularly in the supersonic and hypersonic range.

Another object of the present invention is to provide a velocimeter and method capable of detecting rapid changes in velocity.

These and other objects of the invention are met by providing a velocimeter for measuring flow characteristics of a fluid flow travel through a chamber in a given direction, the flow having tracer particles entrained therein, including a source of radiant energy producing an output stream directed transverse the flow direction of sufficient intensity to vaporize the particles as they pass through the output stream, each of said vaporized particles exploding to produce a shock wave and a hot core, and a flow visualization system for tracking the motion of the hot cores and shock waves over at least two successive time intervals to thereby measure velocity of each tracer particle.

Preferably, the source of radiant energy is a pulsed laser, and the flow visualization system is a schlieren system.

These and other features and advantages of the velocimeter and method of the present invention will become more apparent with reference to the following detailed description and drawings.

BRIEF DESCRIPTION OF THE DRAWINGS

FIG. 2 is a horizontal sectional view of the velocimeter according to the present invention, and schematically illustrating the expanding and convecting hot core and shock waves of vaporized particles.

DETAILED DESCRIPTION OF THE PREFERRED EMBODIMENTS

Figure 1:
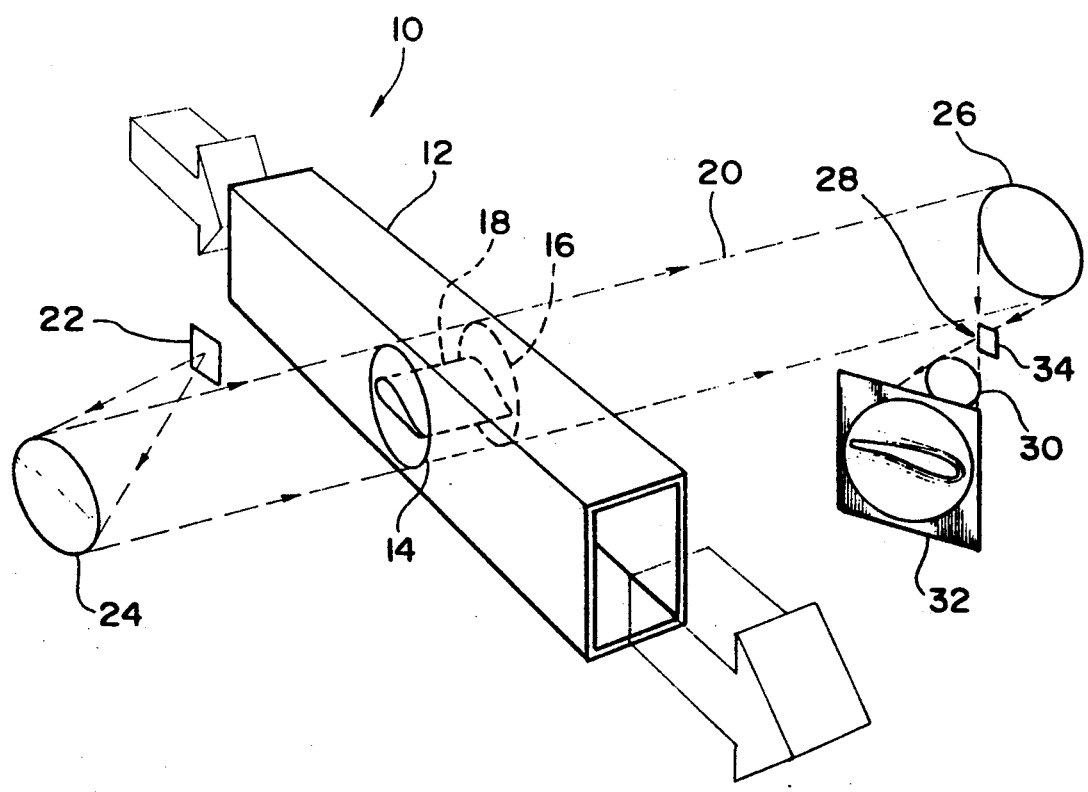
FIG. 1 is a perspective, schematic view of a flow visualization system used in the velocimeter and method of the present invention.

Referring to FIG. 1, a flow visualization system employed by the present invention is generally referred to by the numeral 10 and essentially corresponds to a conventional schlieren. A wind tunnel 12 is provided with a pair of windows 14 and 16 provided in opposite side walls of the tunnel. Fluid flow through the tunnel is indicated by the directional arrows.

A test object, such as an airfoil 18 is mounted between the windows 14 and 16 in a conventional manner. The schlieren has been used in the past for direct visual or photographic observations of aerodynamic effects. A schlieren works on the principle that variations in density result in a change of refractive index, which is a measure of the ability of a transparent medium to bend light. The schlieren uses a beam of light 20 which is passed through a transparent material in which there is a gradient of refractive index at right angles to the beam. The beam will be deflected by refraction from its undisturbed path because light travels more slowly where the refractive index is higher. Several techniques are available to detect these deflections and thus enable the refractive index gradients to be observed and/or recorder.

According to the present invention, any number of schlieren apparatuses and techniques may be employed, as well as other types of visualization systems. The illustrated system of FIG. 1 is by way of example and not limitation. In the example of FIG. 1, a light source 22 directs a diverging beam on a first mirror 24 which directs the beam 20 transversely through the tunnel 12 in the region of the airfoil 18, through the windows 14 and 16. An opposite, second mirror 26 converges the beam at a focal point 28. In order to create the focal point, the mirror 26 is concave so that all parallel rays of light coming in along the axis of the mirror are reflected and an image is formed at the focal point. In practice, the mirror 26 is tilted slightly so that the light source lies outside the parallel reflected beam.

The airfoil 18 is located between the two mirrors 24 and 26 so as to form an image of the airfoil by placing a lens beyond the image of the light source. Thus, a lens 30 is placed beyond the focal point 28 to project the airfoil's image to a video camera, viewing screen, or photographic film 32. Because the light between the two mirrors 24 and 26 is parallel, each point around the airfoil's section itself can be considered to form a separate image of the light source at the focal point of the second mirror 26. If the light is undisturbed on its path, all these images will coincide, producing a point image. However, if there are variations in the refractive index gradient, such as are caused by changes in air density and pressure as air flows across the airfoil section, then some of the light rays will be deflected slightly and will not come into the same focal point as the rest of the light, as shown in FIG. 1. They will, however, be imaged by the lens in the normal way since that is focused on the airfoil 18 section rather than on the point source of light. Because the light has been displaced, and because the displacement is evident at the image in front of the lens, it is possible to reveal deviations which have taken place. A sharp straight edge, usually called a knife edge 34, is placed at the focal point 28 of the second mirror 26 in such a way that if there were no deviations, most of the light would reach the viewing screen, with the total intensity being slightly reduced. If, however, the light is deflected one way or the other, it may be blocked off completely by the knife edge 34, or will pass completely unhindered. Thus, in the first case the image of the airfoil 18 at a certain point will be reduced in brightness and in the second case it will be increased. In this way, the slightest deviation of light across the airfoil section will show up as a lighter or darker region.

Conventional schlieren flow visualization systems have been used to record images of a shock wave of a projectile travelling at high Mach numbers.

Referring now to FIG. 2, the tunnel 12 is shown in a sectional view, with the windows 14 and 16 disposed in opposite side walls 12a and 12b, respectively. In FIG. 2, the airfoil has been removed to illustrate other features of the invention.

The air flow through the tunnel travels at a given velocity U and in a given direction indicated by the directional arrows. The flow visualization system 10 has also been simplified for illustration to have first and second parts 10a and 10b, respectively on opposite sides of the tunnel 12.

The fluid flowing through the tunnel 12 has entrained therein a plurality of small tracer particles 36, which are either solid or liquid. Preferably, the particles 36 are homogeneous and have a particle size of about 1 $\mu$m. A laser 38 produces a pulsed beam 40 which vaporizes the particles 36 as they pass therethrough. The particles are immediately vaporized by the short duration energy pulse, of sufficient intensity, produced by the pulsed laser 38. When the particles 36 explode, they each produce a small shock wave 36a. These shock waves 36a quickly drop to nearly the acoustic speed (small overpressure) and soon become very weak. A hot residue core 36b also results from each explosion. Both the small hot residue core 36b of each explosion and the expanding shock wave 36a thereof are convected at the local stream velocity. Any flow visualization system that shows density or any of its derivatives can show both the hot core 36b and the shock wave 36a, assuming that the features to be observed are not obscured by other flow features. By tracking the motion of the hot core 36b and the shock wave 36a over small time increments, the velocity can be determined for each tracer particle and for each time step by measuring the movement. Thus, a minimum of two photographs, taken in rapid succession (such as 1 ms apart) will produce a measurable flow visualization. In addition, the expansion rate of the shock wave is a function of the local static temperature as long as the overpressure is sufficiently small. Thus, the change of shock wave diameter can be used to derive the temperature.

In FIG. 2, a total of nine particle images are shown after vaporization. This may correspond to a triple exposure photograph showing the movement of only three particles, or a single exposure photograph showing the movement of nine particles at one time. In the latter case, a second photograph would be required to be taken at a known time interval in order to reveal velocity data.

The tracer particles can be of virtually any commercially available variety, such as polystyrene microspheres which are of a uniform 1 $\mu$m diameter. These microspheres may be dispersed in an alcohol and sprayed as an aerosol into the fluid flow. The microspheres are commercially available through Duke Scientific or Dow Chemical.

The laser 38 can be focused as a beam and directed to a specific area of study. For example, the beam may be directed at a trailing edge of the airfoil 18 or at the leading edge, or at any other region thereof to study the aerodynamic effects of the airfoil. The laser may be a ruby pulsed laser, for example, having a beam diameter of about 1 or 2 mm. A sufficient power density to cause an explosion of the tracer particles may be, for example, about 100 millijoules.

Alternative embodiments of the invention may use other energy sources to vaporize the particles, other than a pulsed laser. For example, a continuous wave laser may be used and, for either pulsed or a continuous laser, a laser light sheet may be used instead of a laser beam. A light sheet can be generated by combining the laser source with appropriate commercially available optics.

Other sources of vaporizing energy include pulsed ion beams, electron beams, spark discharge, microwave, etc. Generally, a radiant energy source capable of passing transversely through the flow field without disturbing the flow can be used. Even if the energy source is not pulsed, flow convection results in a short time of interaction with the particle and this would vaporize the particle only if the energy concentration were high enough. Multiple energy inputs to new sets of particles in rapid sequence, multiple exposures of the flow visualization, or a combination of both could give time history for fixed as well as convected locations.

The conventional schlieren described in FIG. 1 would not allow the present invention to be implemented in an optically noisy flow. For these flows, focusing schlieren could be used than non-focusing optical systems. Holographic focusing schlierens could be used to allow a large depth of flow to be examined. Use of dark field focusing schlieren would allow a larger number of exposures without overexposure or loss of sensitivity. Exposures of longer durations than that needed to freeze the flow give velocity vectors as lines rather than successive points and would allow less expensive light sources to be used for the schlieren (such as flash lamps instead of lasers). Also, stereo views could be obtained from two optical systems at a fairly large angle to each other to give the full three-axis velocity vector.

The present invention is capable of giving accurate velocity and useful temperature information over a wider range of test conditions than currently exisiting technology. The methodology of the present invention is also less complex and far less expensive than current combinations of techniques to obtain comparable results. The present invention is based principally on the fact that the tracer particles themselves do not track rapidly changing flow velocity well, but the vaporized hot spots follow the flow very well, even at hypervelocity.

The flow visualization system may include photographic equipment capable of taking multiple exposures to thereby track movement of the expanding and convecting hot core and shock waves of the particles. All that is needed to determine velocity is two consecutive photographs taken in rapid succession, such as at 1 microsecond. Also, the local acoustic speed of the expanding shock wave can easily be correlated to the local temperature, so that according to the present invention velocity and temperature can both be derived from the same flow visualization system.

Numerous modifications and adaptations of the present invention will be apparent to those so skilled in the art and thus, it is intended by the following claims to cover all such modifications and adaptations which fall within the true spirit and scope of the invention.

What is claimed is:

1. A velocimeter for measuring flow characteristics of a flow travelling through a chamber in a given direction, the flow having tracer particles entrained therein, comprising:
    a source of radiant energy producing an output stream directed transverse the chamber and having a sufficient intensity to vaporize the particles as they pass through the output stream, each of said vaporized particles exploding to produce a shock wave and a hot core; and
    a flow visualization system for tracking the motion of the hot cores and shock waves to thereby measure velocity of at least one tracer particle.

2. A velocimeter according to claim 1, wherein the flow visualization system is a schlieren system.

3. A velocimeter according to claim 2, wherein the schlieren system includes a photographic imager for taking pictures of the vaporized particles in closely spaced time intervals to thereby measure the expansion and convection of the hot core and shock waves of the particles.

4. A velocimeter according to claim 3, wherein the schlieren system includes a video imager for taking pictures of the vaporized particles in closely spaced time intervals to thereby measure the expansion and convection of the hot core and shock waves of the particles.

5. A velocimeter according to claim 1, wherein the source of radiant energy is a pulsed laser and the output stream is a pulsed laser beam.

6. A velocimeter according to claim 1, wherein the tracer particles are polystyrene microspheres having a substantially uniform diameter of about 1 $\mu$m.

7. A method of measuring flow characteristics of a flow travelling through a chamber in a given direction, comprising the steps of:
    dispersing a plurality of tracer particles in the flow;
    irradiating the particles with a source of radiant energy having an output stream directed transverse the chamber, the source of energy having a sufficient intensity to vaporize the particles as they pass through the output stream, each of said vaporized particles exploding to produce a shock wave and a hot core; and
    tracking the motion of the hot cores and shock waves with a flow visualization system to thereby measure velocity of each tracer particle.

8. A method according to claim 7, wherein the flow visualization system is a schlieren system.

9. A method according to claim 8, wherein the schlieren system includes a photographic imager for taking pictures of the vaporized particles in closely spaced time intervals to thereby measure the expansion and convection of the hot core and shock waves of the particles.

10. A method according to claim 9, wherein the schlieren system includes a video imager for taking pictures of the vaporized particles in closely spaced time intervals to thereby measure the expansion and convection of the hot core and shock waves of the particles.

11. A method according to claim 7, wherein the source of radiant energy is a pulsed laser and the output stream is a pulsed laser beam.

12. A method according to claim 7, wherein the tracer particles are polystyrene microspheres having a substantially uniform diameter of about 1 $\mu$m.

* * * * *